United States Patent [19]
Reed et al.

[11] Patent Number: 5,507,200
[45] Date of Patent: Apr. 16, 1996

[54] COMBINATION MOTORCYCLE KICKSTAND MECHANISM AND TRANSMISSION FORWARD CONTROL UNIT

[75] Inventors: John Reed; Ignatius J. Panzica, both of Morgan Hill, Calif.

[73] Assignee: Custom Chrome, Inc., Morgan Hill, Calif.

[21] Appl. No.: 359,404

[22] Filed: Dec. 20, 1994

[51] Int. Cl.$^6$ .............................. B62H 1/02; B60K 20/02
[52] U.S. Cl. ........................... 74/474; 280/291; 280/301
[58] Field of Search ............................. 74/474; 280/291, 280/293, 301; 248/188, 188.9, 352

[56] References Cited

U.S. PATENT DOCUMENTS

| | | | |
|---|---|---|---|
| 3,376,049 | 4/1968 | Gordon | 280/301 |
| 3,967,834 | 7/1976 | La Charite | 280/291 |
| 4,083,263 | 4/1978 | Lundquist | 74/474 |
| 4,223,906 | 9/1980 | Gratza | 280/301 |
| 4,417,746 | 11/1983 | Baron | 280/301 |
| 4,971,347 | 11/1990 | Cline | 280/301 |

FOREIGN PATENT DOCUMENTS

| | | | |
|---|---|---|---|
| 484952 | 10/1929 | Germany | 280/291 |
| 407496 | 10/1944 | Italy | 280/291 |
| 9010569 | 9/1990 | WIPO | 280/293 |

OTHER PUBLICATIONS

1994 Custom Chrome Catalog, pp. 90–93.

*Primary Examiner*—Charles A. Marmor
*Assistant Examiner*—Troy Grabow
*Attorney, Agent, or Firm*—Flehr, Hohbach, Test, Albritton & Herbert

[57] ABSTRACT

A combination kickstand mechanism and transmission forward control unit for use with motorcycles. A support body is formed with an internal chamber which fits a lock cylinder that is formed with a slot. A kickstand is provided with a foot portion for contacting the ground or other surface and a head portion which projects into the lock cylinder slot. With the kickstand foot portion tilted to a raised position for contacting the ground or other surface, the detent on the head portion releasably engages a locking cavity in a lock sleeve which is mounted within the support body. A return spring is provided for yieldably urging the kickstand toward a lowered position at which the head portion pivots within the slot for withdrawing the detent from the lock sleeve. A locking recess is formed within the support body, and the detent releasably engages the locking recess when the footrest is moved to a closed position alongside the motorcycle frame.

7 Claims, 6 Drawing Sheets

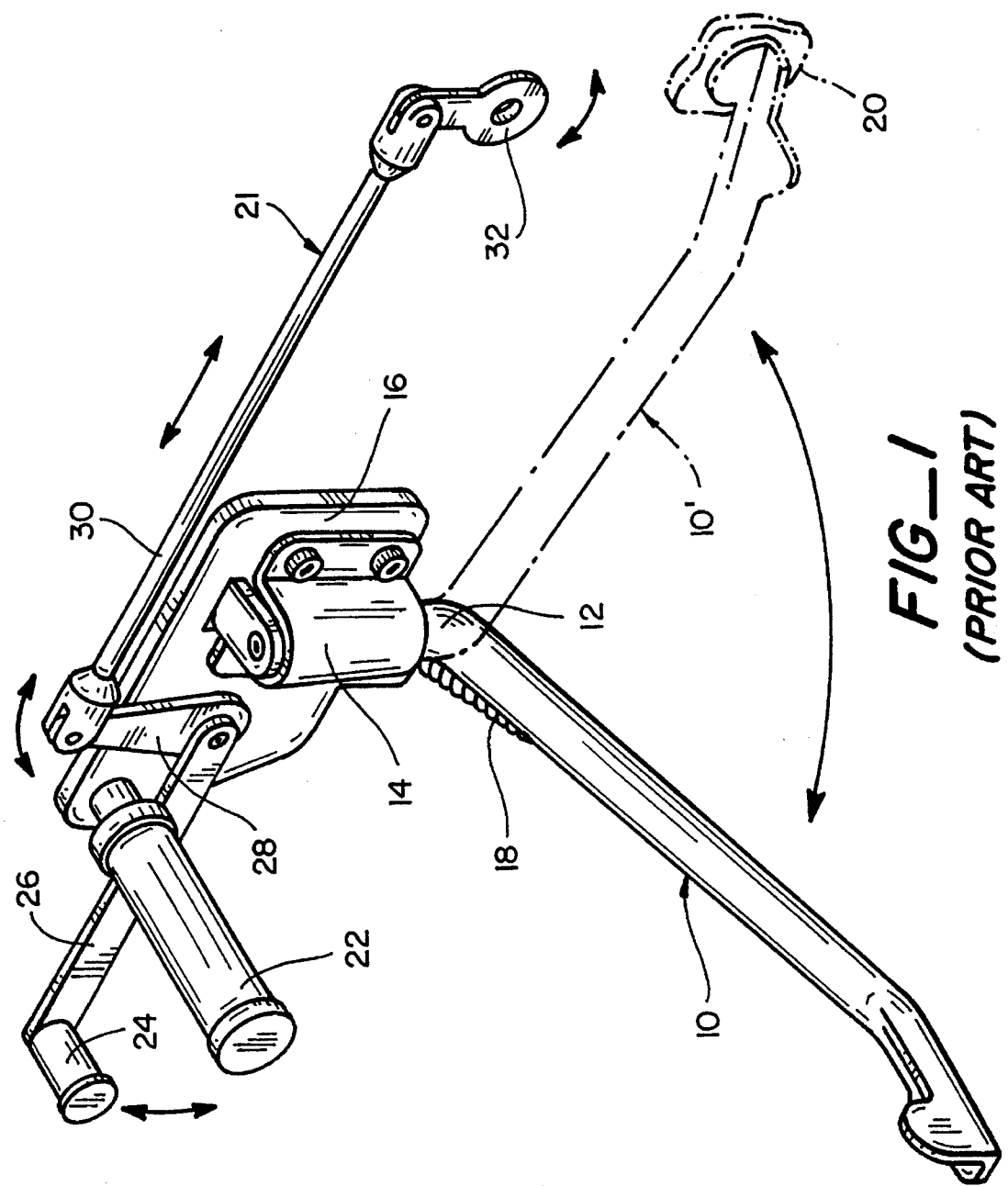
FIG_1 (PRIOR ART)

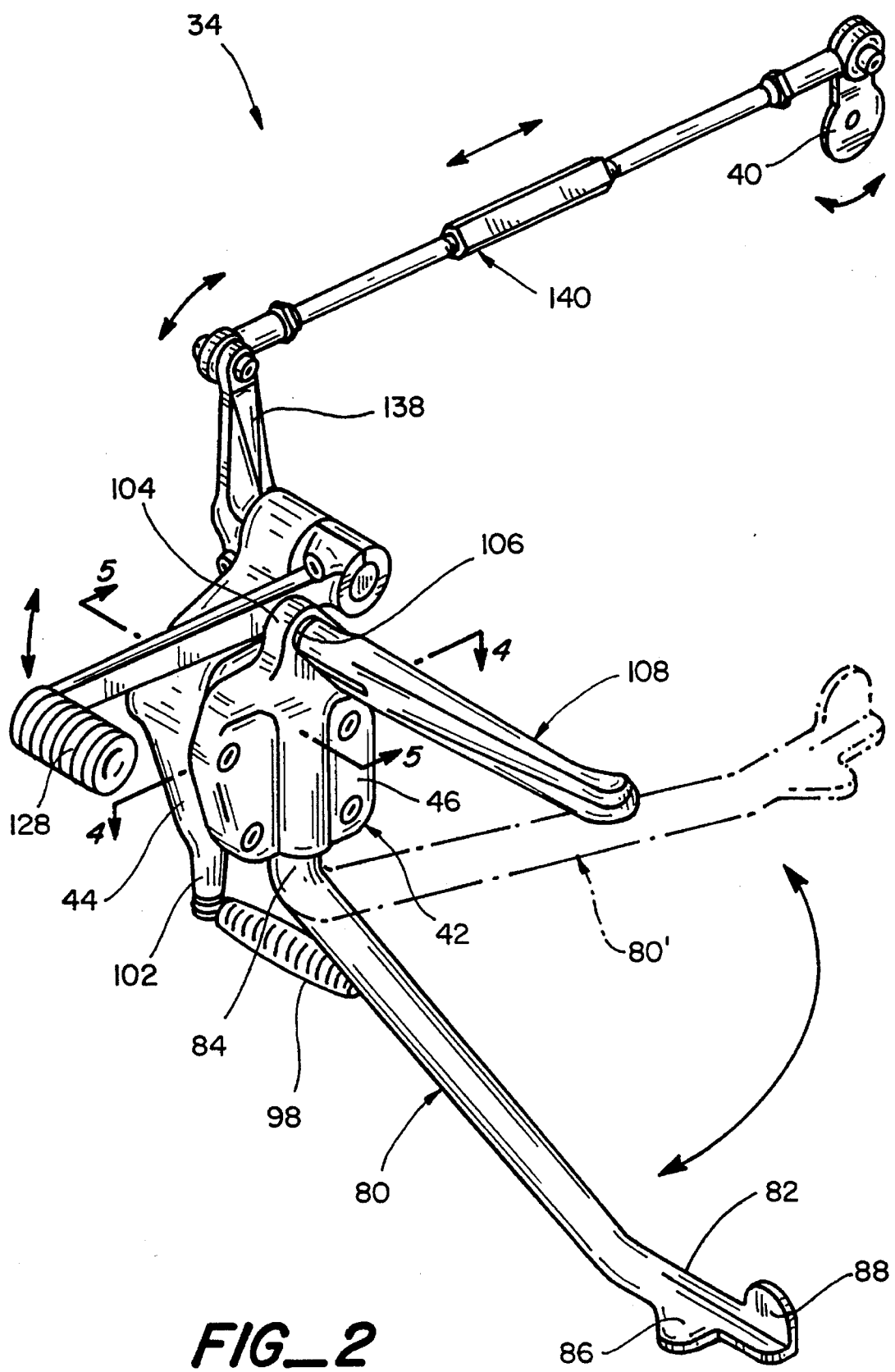
FIG_2

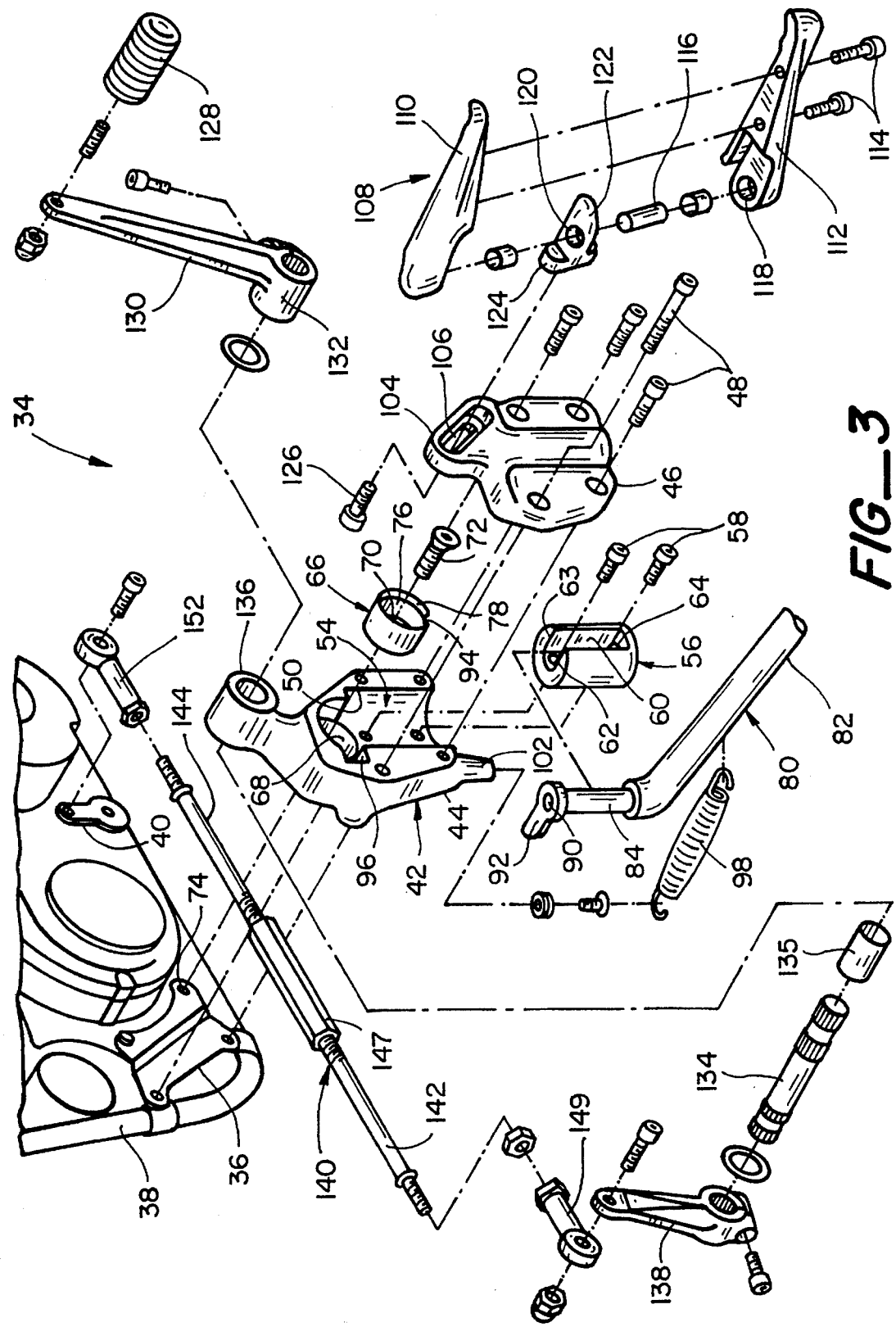
FIG_3

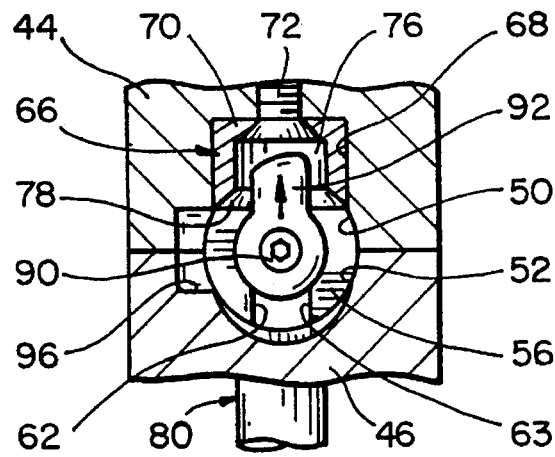
FIG_4A
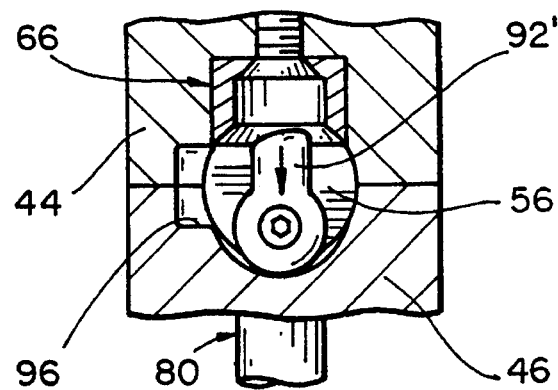
FIG_4B
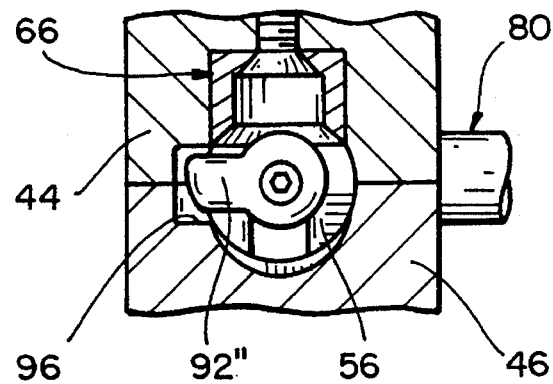
FIG_4C

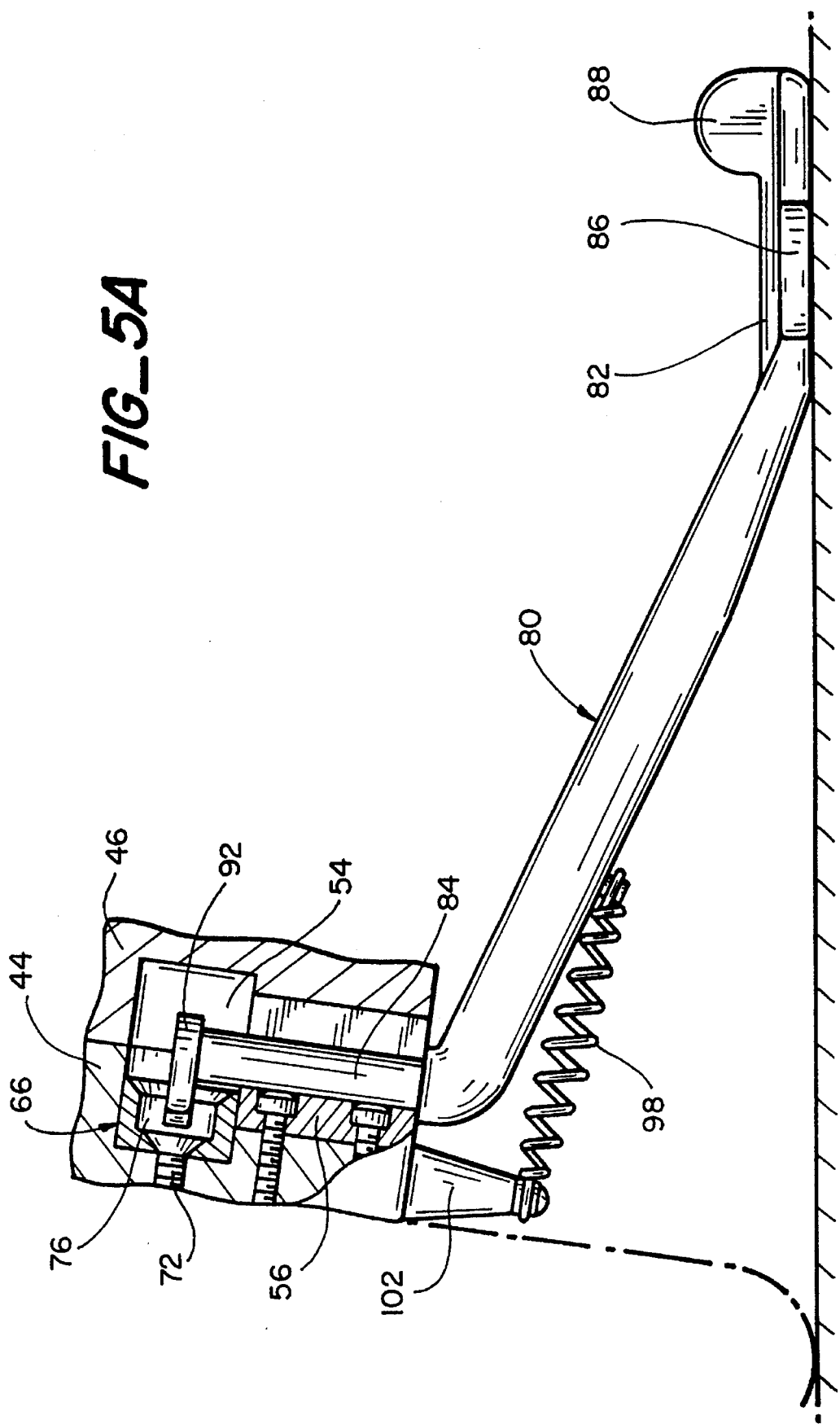

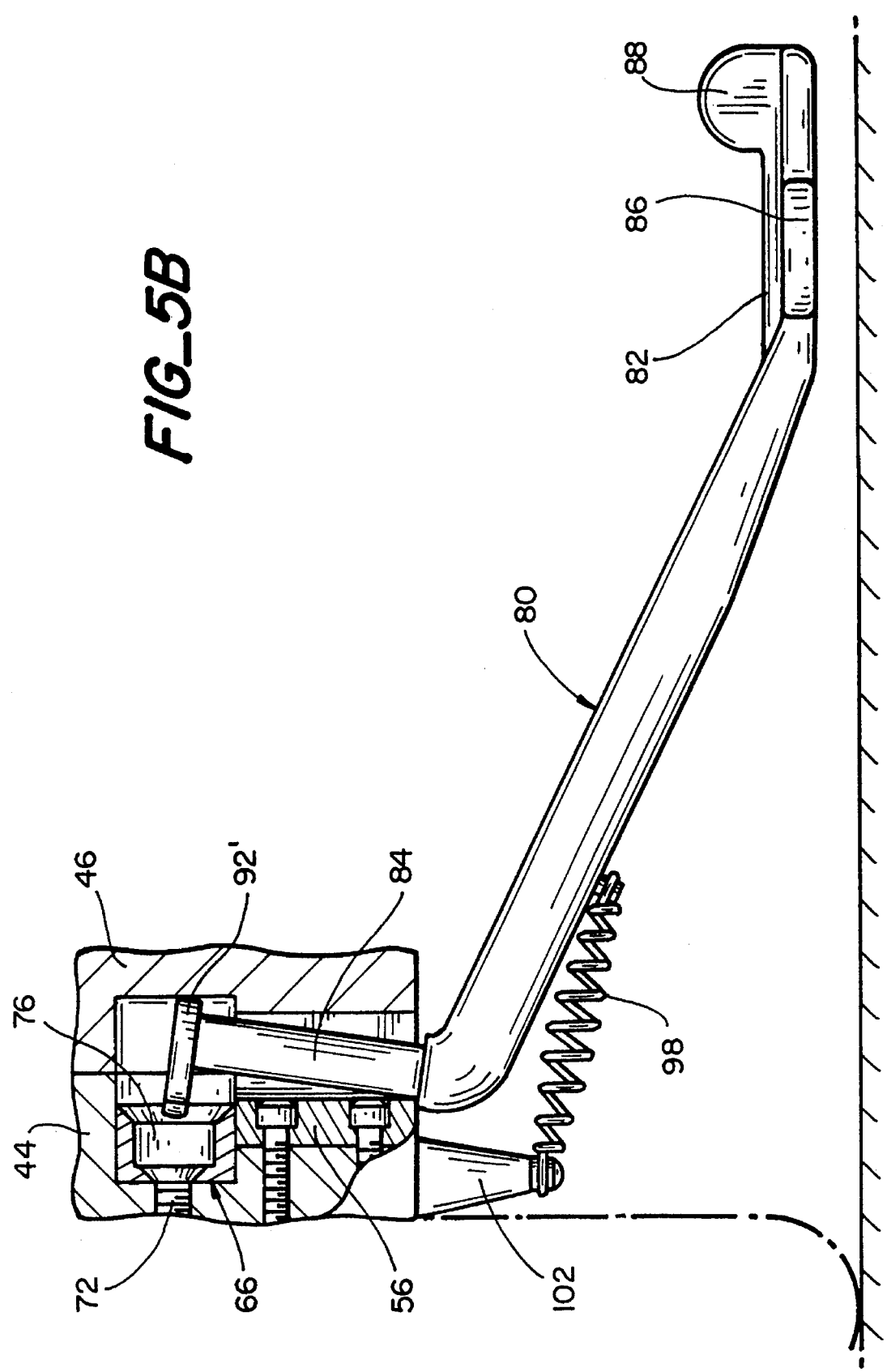

COMBINATION MOTORCYCLE KICKSTAND MECHANISM AND TRANSMISSION FORWARD CONTROL UNIT

BACKGROUND OF THE INVENTION

1. Field of the Invention

This invention relates in general to kickstand mechanisms and transmission forward controls for use with motorcycles. More particularly, the invention relates to a device for use with motorcycles which combines a kickstand mechanism with a transmission shifter in a forward control unit.

2. Description of the Related Art

Conventional motorcycles typically have, on their left hand sides, separate kickstand mechanisms and forward controls for transmission shifting. FIG. 1 shows a typical prior art arrangement comprising a kickstand 10 having a head portion 12 mounted in a shaped metal plate 14. The plate is bolted to a backing plate 16 that is secured to the motorcycle frame. A return spring 18 is mounted between the kickstand and a downwardly projecting portion of the backing plate. The kickstand is moved by the operator's foot between an open position where it supports the motorcycle in an upright stance and the closed position, shown in the phantom lines at 10', against a stop 20, which typically is a rubber pad mounted on the frame.

The prior art FIG. 2 also shows a conventional transmission forward control 21 which is separate from the kickstand mechanism. The forward control unit is comprised of a footrest 22 mounted on the backing plate together with a foot pedal 24 carried on a gear shift arm 26. The gear shift arm is pivotally mounted on the backing plate for turning a crank arm 28 which moves a shift linkage 30 for shifting the transmission lever 32 between selected gear positions.

The typical prior art kickstand mechanisms and transmission forward control units have a number of limitations and disadvantages, such as being relatively weak and subject to damage or failure, the nuts and bolts for mounting the kickstand assembly, are exposed, and the arrangement of parts is aesthetically unattractive.

The need has been recognized for a motorcycle kickstand mechanism and transmission forward control unit which obviates the foregoing and other limitations and disadvantages of the prior art. Despite the various motorcycle kickstand mechanisms and transmission forward control units in the prior art, there has heretofore not been provided a suitable and attractive solution to these problems.

SUMMARY OF THE INVENTION

In general the present invention provides a combination kickstand mechanism and transmission shifter forward control unit for use with motorcycles. A support body which is adapted for mounting on a motorcycle is formed with an internal chamber which mounts a lock cylinder having a slot in which the head portion of a kickstand fits. The support body also carries a lock sleeve having a cavity into which a detent on the kickstand head portion is engaged when the kickstand is tilted upwardly to a raised position where it supports the motorcycle in an upright stance. The chamber of the support body is formed with a locking recess into which the detent is releasably engaged when the kickstand is moved by the user to a closed position at which it is stowed alongside the motorcycle frame. The support body carries a footrest as well as a gear shift pedal. The footrest is mounted in a slideway which permits adjustment to different positions according to the requirements of the user. The gear shift pedal operates a crank arm and shift linkage for shifting the transmission to selected gear ratios. The shift linkage includes means for adjusting the orientation of the gear shift pedal at which the linkage shifts the transmission between neutral and a plurality of different gear ratios. Additional objects and features of the invention will appear from the following description in which the embodiments of the invention are described in detail.

BRIEF DESCRIPTION OF THE DRAWINGS

Additional objects and features of the invention will appear from the Additional objects and features of the invention will appear from the FIG. 1 is a perspective view illustrating a prior art motorcycle kickstand mechanism and a separate transmission forward control.

FIG. 2 is a perspective view illustrating a combination kickstand mechanism and transmission forward control unit in accordance with a preferred embodiment of the invention.

FIG. 3 is an exploded perspective view of the mechanism of FIG. 2.

FIG. 4 is a horizontal section view taken along the line 4—4 of FIG. 2.

FIG. 4B is a horizontal section view similar to FIG. 4A showing certain components of the mechanism in moved positions.

FIG. 4C is a horizontal section view similar to FIG. 4A showing certain components in moved positions.

FIG. 5A is a horizontal section view showing certain components of the mechanism of FIG. 2.

FIG. 5B is a section view similar to FIG. 5A showing components of the mechanism in a moved position.

DESCRIPTION OF THE PREFERRED EMBODIMENTS

FIGS. 2 and 3 illustrate generally at 34 a combination kickstand mechanism and transmission forward control unit in accordance with a preferred embodiment of the invention. This unit is attached by means of a mounting plate 36 to the frame 38 of a typical motorcycle, of which a portion of the engine and transmission shift lever 40 are illustrated in FIG. 3.

Unit 34 is comprised of a support body 42 which includes an inner subassembly 44 and outer subassembly 46. These subassemblies are secured together by bolts 48 (FIG. 3). The bolts are threaded into openings of mounting plate 36 to secure the support body to the motorcycle frame. Each subassembly is formed with a half-round, downwardly opening recess 50, 52 which, when assembled together, form an internal chamber 54 of cylindrical shape.

Fitted within internal chamber 54 of the support body is a lock cylinder 56 which is secured to subassembly 44 by means of a pair of bolts 58.

The lock cylinder is formed on one side with a slot 60 which has a pair of upright, laterally spaced-apart flat sidewalls 62, 63. The lower end of the slot terminates above the lower end of the lock cylinder, and a circular opening 64 is formed through this lower end to provide an entryway into the slot.

A lock sleeve 66 of cylindrical shell configuration and formed of a suitable high strength metal is fitted within a horizontally axised opening 68 in subassembly 44 at the upper end of internal chamber 54. Integrally formed at the outer end of the sleeve is an end plate 70 having a central opening through which bolt 72 extends for threading into a corresponding opening 74 on mounting plate 36. The cylindrical space within the lock cylinder forms a locking cavity 76. The inner peripheral rim of the lock cylinder is formed within an internally beveled surface 78.

A kickstand 80 is provided and it comprises a foot portion 82 and head portion 84. The foot portion is formed with a flared end 86 suitable for contact with a surface, such as the ground or pavement, for supporting the motorcycle in a substantially upright or parked position. An upwardly extending rounded ear 88 is formed on the flared end to facilitate moving the kickstand by means of hitting the ear with the motorcycle rider's foot. The head portion is bent upwardly at an angle from the shank of the kickstand and is suitably sized and shaped for projecting through lock cylinder opening 64 and into slot 60. Mounted by means of a bolt 90 on the distal end of the head portion is a detent 92 which radially projects outwardly in a direction opposite that of the foot portion.

Head portion 84 is free to pivot through a limited range of travel within support body chamber 54 to enable the kickstand to move between a first position, shown at 80' in FIG. 2, at which foot portion 82 is tilted laterally upwardly to a raised position relative to the motorcycle, and a second position shown in solid line at 80 in which the foot portion is tilted laterally downwardly to a lowered position. In the raised position of the foot portion, the kickstand supports the motorcycle in its parked position, with the motorcycle tilting down through a small angle toward the kickstand side. In this position the weight of the motorcycle causes relative pivotal movement between the kickstand head portion and support body 42 to move detent 92 into releasable engagement with locking cavity 76 of the lock sleeve. The distal end of the detent is somewhat rounded, as best shown in FIGS. 4A–4C, for contacting ramp surface 78 of the lock sleeve to facilitate smooth ingress and egress of the detent into and from the locking cavity. A semi-circular cutout 94 (FIG. 3) is formed at the bottom edge of the ramp surface for seating against and holding head portion 84 when the kickstand foot portion is in its raised position.

A locking recess 96 is formed internally within support body 42, and the locking recess opens into the upper end of chamber 54. Kickstand detent 92 is sized and proportioned sufficient to project into and releasably engage with the locking recess when the kickstand is moved to the closed position illustrated in FIG. 4A. When the motorcycle is pushed by the rider from its tilted or parked position to its vertical upright position, the kickstand is initially pivoted by means of a return tension spring 98 so that foot portion 82 is tilted to its lowered position at 80 in FIG. 2. The outer end of the spring is attached to a peg (not shown) secured as by welding to the kickstand shank, and the inner end of the spring is attached to a downwardly extending projection 102 on support body subassembly 44. As the spring moves the kickstand foot portion to this lowered position, the head portion is pivoted so that the detent is moved to position 92' (FIG. 4B) where it is withdrawn from engagement with locking cavity 76. The rider's foot can then be used to push against and move kickstand foot portion 82 backwardly and toward a closed or stowed position alongside the motorcycle frame. At the same time this action causes the kickstand head portion to rotate in a counterclockwise direction, as viewed from above, through approximately 90° until the detent is moved to position 92" so that it is aligned with and moves into releasable engagement with locking recess 96. In this closed position of the kickstand, the direction of tension from spring 98 applies a moment force to the kickstand tending to rotate it in a counterclockwise direction, as viewed from above, so that the detent is releasably held within the locking recess. The coaction between the detent and locking recess provides an integral and internal stop for the kickstand at its closed position. This obviates the need for providing a separate kickstand stop such as the prior art stop 20 of FIG. 1.

Outer subassembly 46 of the support body has a projection 104 which is formed with a forwardly and upwardly inclined slot or slideway 106. The slideway mounts a footrest assembly 108 which is comprised of a pair of half-shells 110, 112 which are mounted together by bolts 114. A transverse pin 116 fits within recesses 118 formed internally at the proximal ends of the half-shells. The pin also fits through an opening 120 formed in a hinge bracket 122 so that the footrest can, if desired, be folded up about the pin 116 to a vertical position. The hinge bracket has an oblong end 124 which is adapted to slidably fit within slideway 106. A bolt 126 is provided for mounting the hinge bracket at selected positions along the slideway to vary the position of the footrest in accordance with individual preferences of the rider.

The transmission forward control components of unit 34 comprise a gear pedal 128 mounted on the distal end of an actuating arm 130. The proximal end of the actuating arm is formed integral with a hub 132 which is internally splined for connection with an operating shaft 134. The operating shaft is rotatably mounted within a bushing 136 formed integral with an arm 136 which projects from the upper end of support body subassembly 44. A crank arm 138 is provided with a hub 139 that is internally splined for connection with the inner end of shaft 134. Gear linkage means is provided for shifting the motorcycle transmission between neutral and a plurality, typically five, of different gear ratios. The gear linkage means includes a turnbuckle assembly 140 comprising a pair of axially aligned rods 142, 144 which are connected together by a nut 147, preferably of octagon cross sectional shape. The juxtaposed ends of the rods are formed with male threads of opposite rotational senses which correspond to female threads in the nut. As is well known, the rods can be drawn axially toward or away from each other by adjustment of the turnbuckle nut in a desired direction. The outer end of rod 140 is connected to the crank arm by means of a heim joint 149, while the outer end of rod 144 is connected to a transmission shift lever 40 by means of a heim joint 152.

The use and operation of the invention is as follows. When the footrest is supporting the motorcycle parked in its upright position, foot portion 80 is in its raised position in contact with the ground or other surface. The weight of the motorcycle tending to tilt it in a direction towards the footrest causes head portion 84 to press against the back of support body chamber 54 so that detent 92 is in releasable engagement with locking cavity 76 of the lock sleeve. This securely holds the footrest to keep the motorcycle upright. To release the footrest, the rider first pushes the motorcycle away from the footrest. Tension spring 98 then is effective to pivot kickstand foot portion 80 down and toward the motorcycle while simultaneously pivoting the head portion outwardly within support body chamber 54 so that the detent is withdrawn from the lock sleeve. The rider's foot can then be used to push the kickstand foot portion to the rear of the motorcycle frame. Kickstand head portion 84 is thereby caused to rotate through about 90° within chamber 54, and this in turn causes the detent to move into releasable engagement with locking recess 96. The force applied by tension spring 98 then becomes effective to releasably hold the kickstand in this stowed position. When it is desired to again park the motorcycle, the rider's foot can be used to push the kickstand away from the motorcycle so that the head portion rotates 90° back within chamber 54. This action withdraws the detent from locking recess 96 and aligns it with lock sleeve 66. The motorcycle is then permitted to tilt by gravity toward the kickstand side, and as the kickstand foot portion contacts the ground, it pivots upwardly relative to the motorcycle and is returned back to its raised position while moving the detent back into engagement with locking cavity 76.

While sitting on the motorcycle, the instep of the rider's left foot is against the top of footrest 108 while the rider's forefoot rests against gear pedal 128. For rider comfort the position of the footrest can be adjusted along guideway 106. As the rider's foot operates the pedal, back and forth pivotal movement of actuating arm 130 causes crank arm 138 to move shift linkage 140 for shifting the transmission. The position at which the pedal and gear pedal actuating arm causes the transmission to shift to a desired gear ratio can be selectively varied by adjusting turnbuckle nut 146.

It will be seen from the foregoing that there has been provided a new and improved combination kickstand mechanism and transmission forward control unit for motorcycles. The unit incorporates components of a kickstand mechanism and forward control into a solid support body which can be easily mounted onto the motorcycle frame. The unit is stronger and more robust than prior art arrangements in which the kickstand and forward control components are independent. The unit has a cleaner design which obviates exposed nuts and bolts of the type found in prior art mechanisms of this type, and is aesthetically more attractive.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A kickstand mechanism for use with a motorcycle, the mechanism comprising the combination of a support body mounted on the motorcycle, said support body being formed with an internal chamber, a lock cylinder mounted within said internal chamber of the support body, said lock cylinder being formed with a slot having a pair of substantially upright, laterally spaced-apart sidewalls, said lock cylinder being formed at its lower end with an opening which provides an entryway into the slot, a kickstand having a foot portion for contact with a surface to support the motorcycle in a substantially upright position and a head portion which projects upwardly through said entryway into the slot of the lock cylinder, said head portion being mounted within the slot for pivotal movement along said sidewalls between a first position at which the kickstand foot portion is tilted laterally upwardly to a raised position relative to the motorcycle for enabling the foot portion to contact said surface and a second position at which the kickstand foot portion is tilted laterally downwardly to a lowered position relative to the motorcycle, a lock sleeve mounted within the support body in juxtaposed relationship with the lock cylinder, said lock sleeve having a locking cavity, said head portion of the kickstand being formed with a detent which projects into releasable engagement with said locking cavity when said head portion is in its first position, said detent being sufficiently sized and proportioned for disengaging from said the locking cavity when the head portion is moved to its second position, means for enabling the kickstand for selective movement between said lowered position and a closed position at which the foot portion is stowed alongside the motorcycle, and return means for applying a yieldable return force on the kickstand for urging the kickstand toward said lowered position.

2. A mechanism as in claim 1 in which the support body is formed with a locking recess which opens into said internal chamber, and said detent on the head portion of the kickstand is oriented to project into and releasably engage with the locking recess when the kickstand is in its closed position.

3. A mechanism as in claim 2 in which said return means applies the yieldable force, when the kickstand is in its closed position, in a direction which urges the detent into the locking recess of the support body whereby the kickstand is releasably held in its closed position.

4. A mechanism as in claim 1 in which said lock sleeve is comprised of a substantially horizontally axised cylindrical wall having an outer circular end formed with an internally beveled ramp surface, and means for enabling said detent of the head portion to slide over the ramp surface into and out of said releasable engagement with the locking cavity.

5. A mechanism as in claim 1 which includes a footrest, said support body is formed with a slideway which is elongated in a predetermined direction which respect to the motorcycle, and means for mounting the footrest on the support body at selected positions along the slideway whereby the position of the footrest relative to a rider on the motorcycle can be varied.

6. A mechanism as in claim 1 in which the motorcycle includes a transmission which is capable of being shifted between neutral and a plurality of different gear ratios, the mechanism further comprising a gear pedal having an actuating arm mounted on the support body for pivotal movement between a plurality of operating positions, and gear linkage means for shifting the transmission responsive to pivotal movement of the gear pedal actuating arm between said operating positions.

7. A mechanism as in claim 6 which is further characterized in that said gear linkage means includes a turnbuckle assembly comprising first and second axially aligned rods, said rods having juxtaposed ends formed with threads of opposite rotational senses, said turnbuckle assembly further comprising a nut having opposite ends with openings formed with threads of rotational senses which correspond to the threads of respective one of the rod ends, said nut being threadably mounted on the juxtaposed ends of the rods whereby rotation of the nut causes the rods to move in opposite directions lengthwise relative to the nut for selectively adjusting the length of the linkage means and thereby adjusting the orientation of the gear pedal, relative to the motorcycle, at which said operating positions of the gear pedal actuating arm cause the transmission to shift between said neutral and plurality of different gear ratios.

\* \* \* \* \*